(12) United States Patent
Gilles et al.

(10) Patent No.: US 11,372,369 B2
(45) Date of Patent: Jun. 28, 2022

(54) METHOD FOR GENERATING A DIGITAL HOLOGRAM, ASSOCIATED DEVICE, HOLOGRAPHIC DISPLAY SYSTEM AND COMPUTER PROGRAM

(71) Applicant: FONDATION B-COM, Cesson Sevigne (FR)

(72) Inventors: Antonin Gilles, Rennes (FR); Patrick Gioia, Servon sur Vilaine (FR)

(73) Assignee: FONDATION B-COM, Cesson Sevigne (FR)

( * ) Notice: Subject to any disclaimer, the term of this patent is extended or adjusted under 35 U.S.C. 154(b) by 48 days.

(21) Appl. No.: 17/255,612

(22) PCT Filed: May 28, 2019

(86) PCT No.: PCT/EP2019/063890
§ 371 (c)(1),
(2) Date: Dec. 23, 2020

(87) PCT Pub. No.: WO2020/001905
PCT Pub. Date: Jan. 2, 2020

(65) Prior Publication Data
US 2021/0263468 A1 Aug. 26, 2021

(30) Foreign Application Priority Data
Jun. 28, 2018 (FR) ...................................... 1855901

(51) Int. Cl.
*G03H 1/08* (2006.01)
*G02B 27/01* (2006.01)
(Continued)

(52) U.S. Cl.
CPC ....... *G03H 1/0808* (2013.01); *G02B 27/0103* (2013.01); *G02B 27/0172* (2013.01);
(Continued)

(58) Field of Classification Search
CPC ............... G03H 1/0808; G03H 1/0005; G03H 2001/0088; G03H 2001/0825;
(Continued)

(56) References Cited

U.S. PATENT DOCUMENTS 9,500,470 B2 * 11/2016 Lee ...................... G03H 1/2249
10,990,063 B2 * 4/2021 Nam .................... G03H 1/2294
(Continued)

OTHER PUBLICATIONS

International Search Report for PCT/EP2019/063890 dated Jul. 19, 2019, 5 pages.
(Continued)

*Primary Examiner* — Tung T Vo
(74) *Attorney, Agent, or Firm* — Nixon & Vanderhye

(57) ABSTRACT

Disclosed is a method for generating a digital hologram representing a 3D scene including an object, an object being defined by points and their associated intensity. For each object, a prior step of calculating an "omnidirectional" angular spectrum of the light field emitted by an object in the scene on the surface of a geometric solid centered on the object, a surface of the solid being sampled according to a predetermined grid, a sample of the grid being associated with a vector frequency; for the scene, the following steps: —obtaining a pose of an observer in the world frame of reference; —deriving the hologram from the scene as a function of the pose obtained from the "multidirectional" angular spectra calculated for each object. The step of calculating an angular spectrum of the light field for each object of the scene takes into account predetermined viewing directions.

20 Claims, 10 Drawing Sheets

(51) Int. Cl.
*G03H 1/00* (2006.01)
*H04N 13/366* (2018.01)
*H04N 13/385* (2018.01)

(52) U.S. Cl.
CPC ......... *G03H 1/0005* (2013.01); *H04N 13/366* (2018.05); *H04N 13/385* (2018.05); *G02B 2027/0109* (2013.01); *G02B 2027/0174* (2013.01); *G03H 2001/0088* (2013.01); *G03H 2001/0825* (2013.01)

(58) Field of Classification Search
CPC ......... G03H 2210/30; G03H 2210/452; G02B 27/0103; G02B 27/0172; G02B 2027/0109; G02B 2027/0174
USPC .......................................................... 348/40

See application file for complete search history.

(56) References Cited

U.S. PATENT DOCUMENTS

| | | | |
|---|---|---|---|
| 2012/0008181 A1* | 1/2012 | Cable | G03H 1/2294 359/9 |
| 2014/0300941 A1* | 10/2014 | Chang | G03H 1/0808 359/9 |
| 2016/0231706 A1* | 8/2016 | Oh | G03H 1/0808 |
| 2017/0154235 A1* | 6/2017 | Morard | G06V 10/507 |

OTHER PUBLICATIONS

Written Opinion of the ISA for PCT/EP2019/063890 dated Jul. 19, 2019, 7 pages.
Yusuke Sando et al., "Hidden surface removal of computer-generated holograms for arbitrary diffraction directions", Applied Optics, Optical Society of America, vol. 52, No. 20, Jul. 1, 2013, pp. 4871-4876.
Antonin Gilles et al., "Hybrid approach for fast occlusion processing in computer-generated hologram calculation", Applied Optics, vol. 55, No. 20, Jul. 10, 2016, p. 5459.

* cited by examiner

METHOD FOR GENERATING A DIGITAL HOLOGRAM, ASSOCIATED DEVICE, HOLOGRAPHIC DISPLAY SYSTEM AND COMPUTER PROGRAM

This application is the U.S. national phase of International Application No. PCT/EP2019/063890 filed May 28, 2019 which designated the U.S. and claims priority to FR Patent Application No. 1855901 filed Jun. 28, 2018, the entire contents of each of which are hereby incorporated by reference.

1. FIELD OF THE INVENTION

The field of the invention is that of digital holography, in particular the generation of a digital hologram from geometric information of a 3D scene.

The invention relates to a method for rapid calculation of a digital hologram and can in particular, but not exclusively, be applied to the real-time rendering of a 3D scene on a head-mounted display in a context of virtual or augmented reality. The holographic head-mounted display immerses the user into a three-dimensional virtual world superimposed or not to the real environment, in which he can move freely. As a function of the movements and displacements of the user, the hologram displayed on the head-mounted display must be recalculated in real-time, which requires a high power of calculation.

2. PRESENTATION OF THE PRIOR ART

Figure 1:
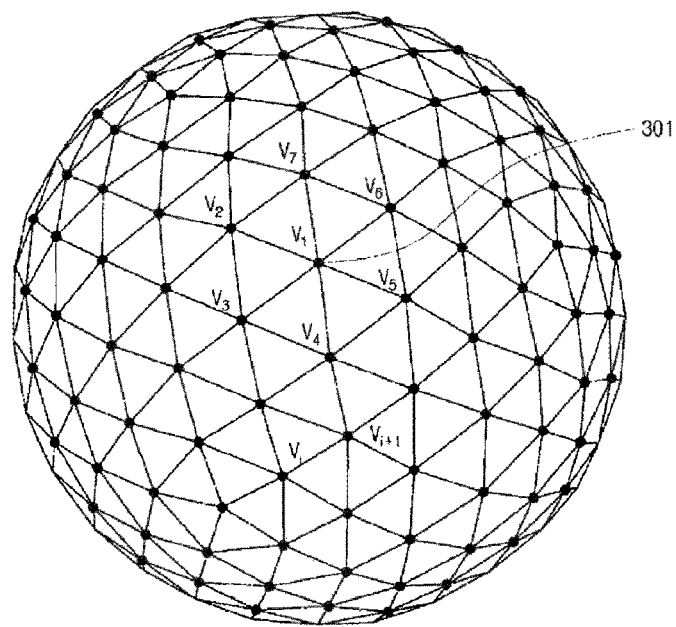

It is known from the U.S. Patent application, published under No US2016/0231706 A1, a method for generating a digital hologram from a pre-calculated omnidirectional angular spectrum of an object of a 3D scene. The description information of the scene comprises a meshing of the object. As illustrated in FIG. 1, the omnidirectional angular spectrum of the object corresponds to the plane-wave decomposition of the light field emitted by the object. Each plane wave is represented by a frequency coordinate vector corresponding to its direction of propagation and by a complex amplitude. According to this method, the angular spectrum of the light field emitted by the object is calculated at the surface of a sphere centered on this object. The surface of this sphere is sampled by successive subdivisions of a regular icosahedron, a vertex of the icosahedron meshing being associated with a frequency coordinate vector of the spectrum.

Figure 2:
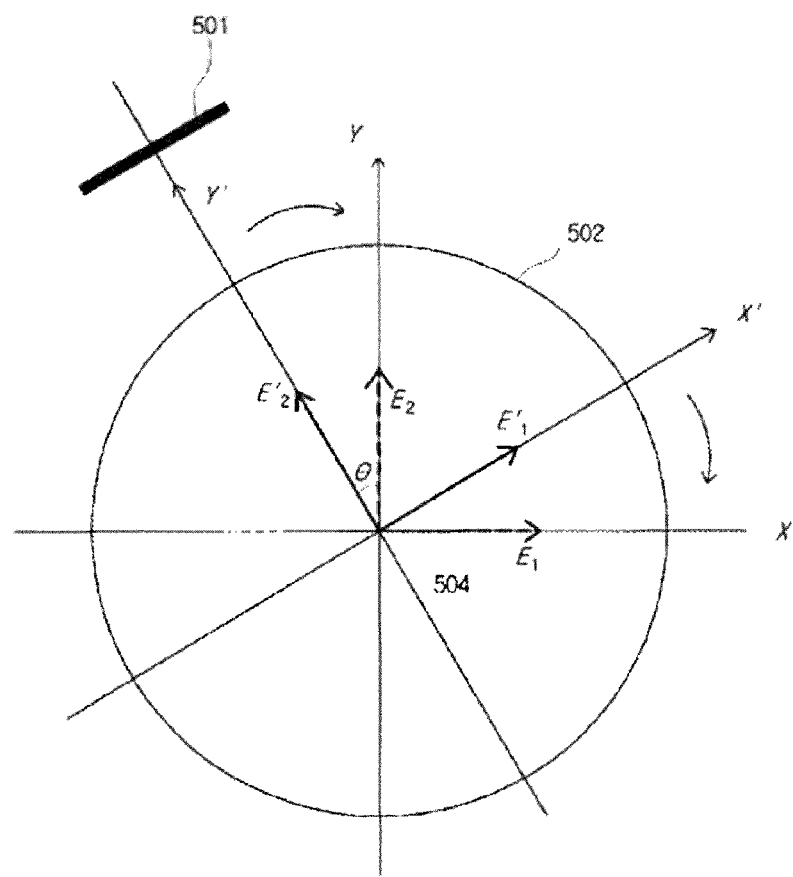

As illustrated by FIG. 2, the hologram plane is perpendicular to an axis that passes through the center of the sphere. The position of this plane is defined by an angle of rotation and by a distance to the center of the sphere.

For each point of the object, a viewing cone is considered, which is centered on a normal to the surface of this point and whose angle is equal to or lower than a maximum diffraction angle of the hologram, itself linked to the size of the pixels of the hologram and to the wavelength. The frequency coordinate vectors included in this cone are selected. They are then tested to determine if they cross a meshing of the object. Those which do not intersect the object are not occulted and hence serve to calculate a Fourier coefficient of the angular spectrum of the light field emitted by the object. The Fourier coefficients obtained for each of the meshes of the object are accumulated to form the "omnidirectional" angular spectrum.

Figure 3:
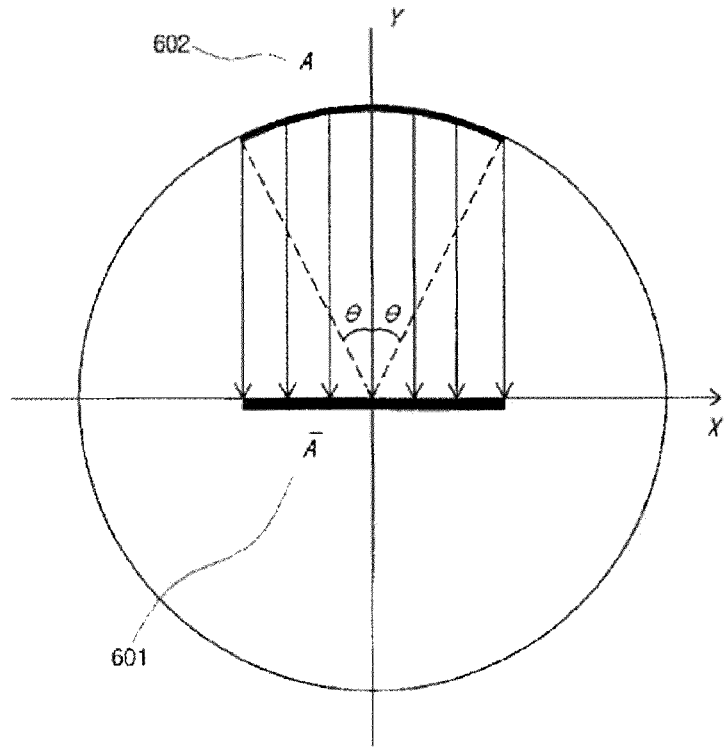

Based on this angular spectrum, it is possible to derive a hologram located in a plane that is perpendicular to an axis passing through the center of the sphere, such as that of FIG. 2, whose angular position and distance to the center of the sphere are known. The knowledge of this angular position of the hologram plane is used to rotate the omnidirectional angular spectrum towards the hologram plane and to convert it into a planar spectrum defined in a plane tangent to the sphere and parallel to the hologram plane, as illustrated by FIG. 3. The obtained planar angular spectrum is then propagated over the distance that separates it from the hologram plane along an axis that passes through the center of the sphere. The hologram is generated by application of a (inverse) Fourier transform to the propagated spectrum.

A first advantage of this solution is that it pre-calculates an omnidirectional angular spectrum of the object of the scene, from which it derives in real time any hologram whose plane is parallel to a tangent to the sphere that contains the object.

A second advantage of this solution is that it manages the occultations of all or part of the object from the observer's point of view, so that the generated hologram offers a realistic viewing of the scene.

3. DRAWBACKS OF THE PRIOR ART

A first drawback of the proposed method is that it only provides for a single object, which limits its possibilities of use.

A second drawback of this method is that the occultation management is made using a test of intersection between each light ray and the geometry of the scene, which is extremely calculation-time consuming.

A third drawback of this method is that it calculates the omnidirectional angular spectrum at the surface of a sphere sampled by successive subdivisions of a regular icosahedron. To derive the planar spectrum of the hologram, the extraction of plane waves from this sampling requires the use of a graph travel algorithm to travel through all the vertices of the meshing, which is relatively complex.

A fourth drawback of this method is that the pre-calculation of the omnidirectional angular spectrum of the scene depends on the size of the pixels of the hologram, which prevents the so-calculated omnidirectional angular spectrum to be reusable for holograms having dimensions and resolutions, and hence pixel sizes, different from those which were initially planned.

A fifth drawback of this method is that it restricts the possible positions of the hologram plane, as shown by equation 2 of the document US2016/0231706, to a rotation in a plane of the sphere and a translation along one of these rays. It hence does not allow generating a hologram whose optical axis is not directed towards the center of the object.

4. OBJECTS OF THE INVENTION

The invention helps in improving the situation.

The invention has in particular for object to overcome these drawbacks of the prior art.

More precisely, an object of the invention is to propose a less complex solution while guarantying the generation of a hologram that offers a quality viewing of the scene.

Another object of the invention is to propose a solution for generating a hologram adapted to the viewing of a scene comprising several objects.

Still another object of the invention is to propose a solution for generating a hologram that allows a viewing of the scene from any position.

5. DISCLOSURE OF THE INVENTION

These objects, as well as others that will appear hereinafter, are achieved by means of a method for generating a digital hologram representative of a 3D scene, said scene comprising at least one object, said object being defined by a set of points and their associated intensity, said method comprising:

For each object, a preliminary step of calculating an "omnidirectional" angular spectrum of the light field emitted by the object at the surface of a geometric solid centered on said object, a surface of said solid being sampled according to a predetermined grid, a sample of the grid being associated with a frequency vector and an amplitude corresponding to a sum of contributions to the light field of points of the object along a direction equal to that of the frequency vector;

For the scene, the following steps:
obtaining a pose of an observer;
deriving an angular spectrum of the hologram of the scene as a function of the obtained pose and from the "omnidirectional" angular spectra calculated on a per-object basis.

According to the invention, the step of calculating an angular spectrum of the light field for each object of the scene comprises, for a plurality of predetermined viewing directions, the following sub-steps:

for each viewing direction:
determining a sub-set of points of the object, comprising the non-occulted points;
calculating an angular sub-spectrum of the light field emitted by the points of the determined sub-set; and
summing over the plurality of predetermined angular directions the amplitudes of the calculated angular sub-spectra, associated with a same sample of the grid.

The invention is based on the approach described in the prior art for generating holograms, which consists in pre-calculating an omnidirectional angular spectrum for each object of a scene at the surface of a geometric solid whose samples are associated with frequency vectors of the spectrum, and, upon reception of an observer's pose, deriving from the spectra calculated on a per-object basis a hologram of the entire scene, adapted to this pose. Moreover, for the pre-calculation of the omnidirectional angular spectrum on a per-object basis, the invention proposes, in a completely new and inventive manner, to manage exactly the occultations for only a limited number of viewing directions of the scene. For each viewing direction, it determines a sub-set of the non-occulted points of the object then pre-calculates an angular sub-spectrum of the light field emitted by the points of this sub-set. The angular spectrum emitted by the object is then obtained by accumulation of the contributions of each of these sub-spectra.

Contrary to the prior art that manages exactly the occultations by a frequency vector associated with a sample of the surface of a sphere, the invention hence proposes an approximation that allows making the method for generating a hologram, in particular the pre-calculation step, less complex.

The geometric solid used may be of any type, for example a sphere or a faced geometric solid, such as a cube or an octahedron.

According to an aspect of the invention, the step of determining the sub-set of non-occulted points comprises the following sub-steps:

2D+Z rendering the object by projecting the points of the object along the viewing direction and forming an intensity image and a depth map of the projected points; and inversely projecting the points of the formed intensity image to points of the object in a reference frame of the object and calculating the coordinates thereof as a function of the depth map.

According to this embodiment of the invention, the sub-set of the non-occulated points of an object for a given viewing direction is determined using a technique of 2D+Z rendering by projection on intermediate intensity image and depth map, followed with an inverse projection. This projection can for example be a perspective or an orthographic projection. An advantage of this approach is that it is simple to implement and that, contrary to the prior art, it does not require knowing a meshed model of the 3D scene. The obtained sub-set of points serves as a basis for the invention to pre-calculate the angular sub-spectrum associated with the viewing direction.

According to another aspect of the invention, the step of calculating the angular sub-spectrum comprises a sub-step of determining an area of validity of the occultations associated with a viewing direction at the surface of the geometric solid and the calculation of the sample amplitudes is performed for the samples comprised in said area.

An advantage is to delimit an area, at the surface of the geometric solid, in which the occultations calculated for a given viewing direction are valid, in order to guarantee the generation of a hologram of good quality.

According to still another aspect of the invention, the samples comprised in the area of validity satisfy the following condition:

$$V_{j,x}x + V_{j,y}y + V_{j,z}z > 0$$

where (x,y,z) denotes the position of the sample and (Vj,x, Vj,y, Vj,z) denotes the viewing direction (Vj) in a reference frame (Ri) of the object (Obi).

An advantage of this particular condition is that it is simple to implement. Moreover, the portion of the surface of the geometric solid considered as valid is included in a cone centered on the viewing direction (Vj).

This particular cone has an angle of 90° with respect to the viewing direction, which allows guaranteeing an overlap of the directional angular spectra, even for a low number of viewings, and hence avoiding the "hops" or breaks in continuity in the viewing of the hologram, when the observer's pose changes and makes use, for the hologram calculation, of another viewing direction.

According to another aspect of the invention, the geometric solid comprises a plurality of plane faces and the predetermined grid is cut into a plurality of sub-grids forming a regular grid pattern, a sub-grid being associated with a face of the solid.

An advantage of a sampling grid of regular grid pattern is that the calculation of the angular spectrum of each object is simplified, because the predetermined grid neither includes successive subdivisions of a regular icosahedron, nor requires the use of a graph travel algorithm to travel through all the vertices of the meshing and to calculate the complex amplitudes of the plane waves associated with the samples. Moreover, the storage of the samples thereof and the access to their amplitudes are facilitated.

According to still another aspect of the invention, the amplitude associated with a sample of the sub-grid of a face of the solid, for the calculation of the angular sub-spectrum along a said viewing direction, is defined by the following formula:

$$A_{i,j}(x, y, z) = \sum_{k=1}^{M_x M_y} \sqrt{I_{i,j}(u_k, v_k)} \exp\left(-j\frac{2\pi}{\lambda}(f_x x_k + f_y y_k + f_z z_k)\right),$$

with Mx, My the dimensions of the intensity and depth images, λ the wavelength used, and $$\begin{pmatrix} f_x \\ f_y \\ f_z \end{pmatrix} = \frac{1}{\sqrt{x^2+y^2+z^2}} \begin{pmatrix} x \\ y \\ z \end{pmatrix}$$

the frequencies associated with the sample (x,y,z).

An advantage is that this amplitude does not depend on the resolution nor on the size of the pixels of the hologram to be derived. The angular spectrum obtained by summing the sub-spectra is hence usable to generate a hologram of any dimensions.

According to still another aspect of the invention, the geometric solid is a cube.

An advantage of its square faces is that they still facilitate the storage of the samples of the angular spectrum and the access thereto during the step of deriving the hologram spectrum. There indeed exist memory structures of the "cube map" type, which are dedicated to this format and very performing in terms of storage.

According to still another aspect of the invention, the plurality of viewing directions comprises as many directions as the solid has faces.

An advantage of this embodiment is that it is simple to implement while guaranteeing a uniform distribution in space of the viewing directions.

According to another aspect of the invention, the step of deriving an angular spectrum of the hologram of the scene comprises deriving an angular spectrum of a sub-hologram for each object of the scene from the angular spectrum of said object, summing the angular spectra of the derived sub-holograms and applying an inverse Fourier transform to the derived angular spectrum to obtain the hologram.

An advantage of this embodiment is the simplicity thereof, because the angular spectra of the objects of the scene are generated individually. Another advantage is that handling the objects of the scene is very easy, for example making appear or disappear an object of the scene, or also moving it in the scene independently from the others.

According to still another aspect of the invention, the angular spectrum of the hologram is derived from "multi-directional" angular spectra calculated on a per-object basis according to the following formula:

$$\hat{H}(f_{h,x}, f_{h,y}) =$$

$$\sum_{i=1}^{N} SA_i\left(\frac{f_x}{\lambda F}, \frac{f_y}{\lambda F}, \frac{f_z}{\lambda F}\right) \exp\left(j2\pi\left(s_x f_{h,x} + s_y f_{h,y} + s_z \sqrt{\lambda^{-2} - f_{h,x}^2 - f_{h,y}^2}\right)\right),$$

where:

$\mathcal{R} = (O; \vec{x}_h, \vec{y}_h, \vec{z}_h)$ denotes a local reference frame of the hologram whose origin is located at the center of the hologram H, whose axes defined by $\vec{x}_h$ and $\vec{y}_h$ coincide with the horizontal and vertical axes of the hologram, respectively, and whose axis defined by $\vec{z}_h$ coincides with the optical axis of the hologram. Let's note $$\vec{x}_h = \begin{pmatrix} x_{h0} \\ x_{h1} \\ x_{h2} \end{pmatrix}, \vec{y}_h = \begin{pmatrix} y_{h0} \\ y_{h1} \\ y_{h2} \end{pmatrix} \text{ and } \vec{z}_h = \begin{pmatrix} z_{h0} \\ z_{h1} \\ z_{h2} \end{pmatrix}.$$

$$F = \max(f_x, f_y, f_z),$$

$$\begin{pmatrix} s_x \\ s_y \\ s_z \end{pmatrix} = \begin{bmatrix} x_{h0} & x_{h1} & x_{h2} \\ y_{h0} & y_{h1} & y_{h2} \\ z_{h0} & z_{h1} & z_{h2} \end{bmatrix} \begin{pmatrix} x_i - x_0 \\ y_i - y_0 \\ z_i - z_0 \end{pmatrix}$$

denotes the position of the center of the object Obi in the reference frame $\mathcal{R}_h$, and $$\begin{pmatrix} f_x \\ f_y \\ f_z \end{pmatrix} = \begin{bmatrix} x_{h0} & y_{h0} & z_{h0} \\ x_{h1} & y_{h1} & z_{h1} \\ x_{h2} & y_{h2} & z_{h2} \end{bmatrix} \begin{pmatrix} f_{h,x} \\ f_{h,y} \\ \sqrt{\lambda^{-2} - f_{h,x}^2 - f_{h,y}^2} \end{pmatrix}$$

denote the frequency coordinates of the angular spectrum of the hologram in the reference frame (Ri) of the object Obi.

An advantage of this embodiment is that it allows generating a hologram adapted to any pose of the observer.

The invention also relates to a device for generating a digital hologram adapted to implement the method for generating a digital hologram according to any one of the particular embodiments defined hereinabove.

This device for generating a hologram can of course include the different features relating to the method according to the invention. Hence, the features and advantages of this device are the same as those of the method, and are not described in more detail.

Correlatively, the invention also relates to a holographic rendering system comprising a device for generating a hologram according to the invention.

According to an aspect of the invention, said system comprises a head-mounted display intended to be worn on the observer's head, said head-mounted display comprising a storage module adapted for the storage of the omnidirectional angular spectrum pre-calculated for the at least one object of the scene.

An advantage is that, as the angular spectra of the objects are stored locally, the head-mounted display can derive in real time a hologram adapted to the observer's pose.

The invention also relates to a computer program including instructions for implementing the steps of a method for generating a digital hologram as described hereinabove, when this program is executed by a processor.

This program may use any programming language. It may be downloaded from a communication network and/or recorded on a computer-readable medium.

The invention finally relates to a recording medium, readable by a processor, integrated or not to the device for generating a digital hologram according to the invention, potentially removable, memorizing respectively a computer program implementing a method for generating a digital hologram, as described hereinabove.

6. LIST OF FIGURES

Figure 5A:
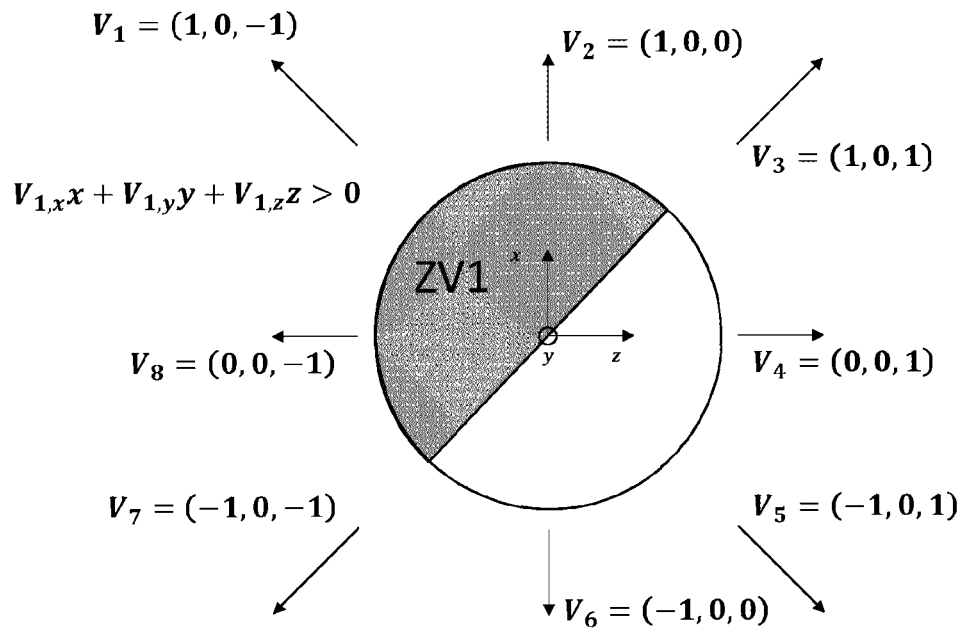
Figure 4:
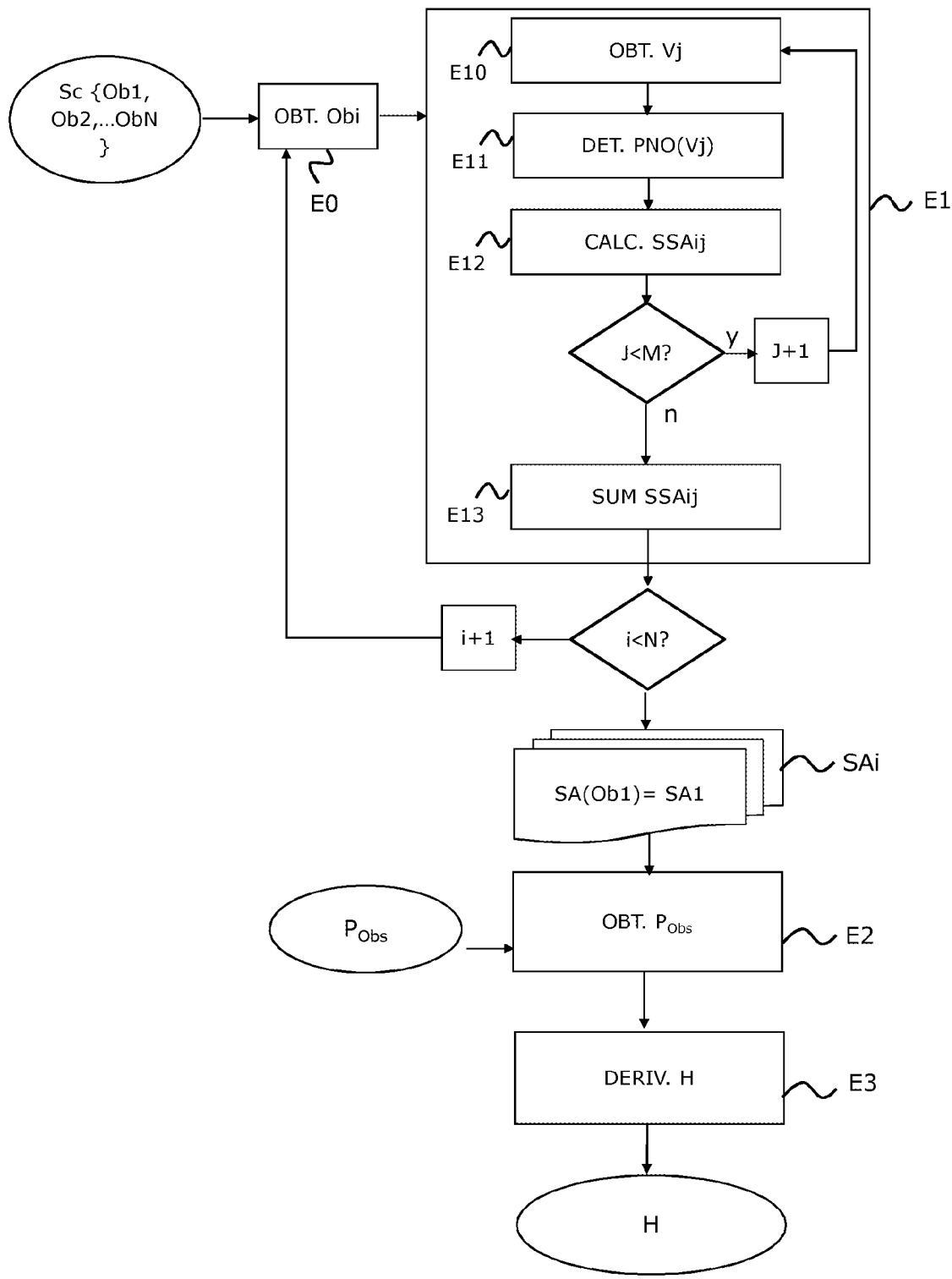
Figure 5B:
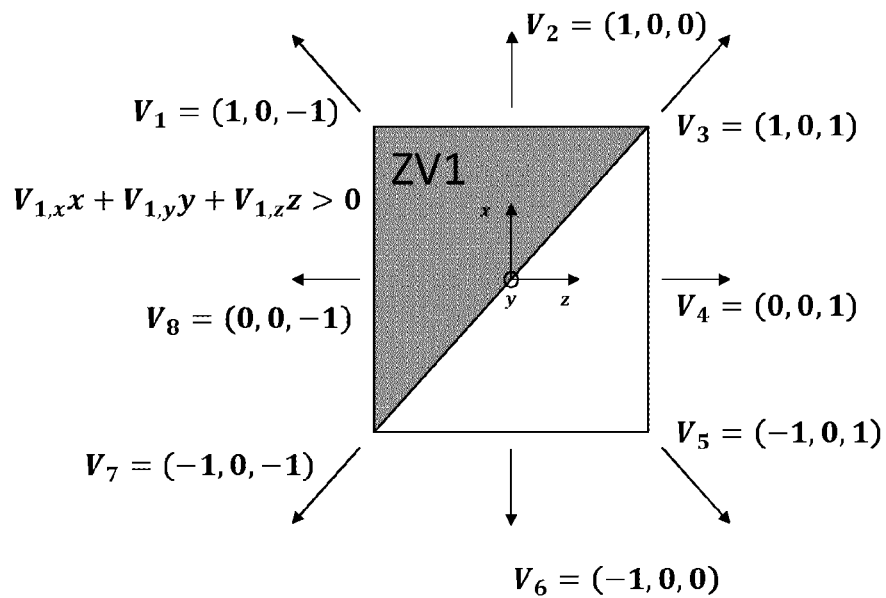
Figure 5C:
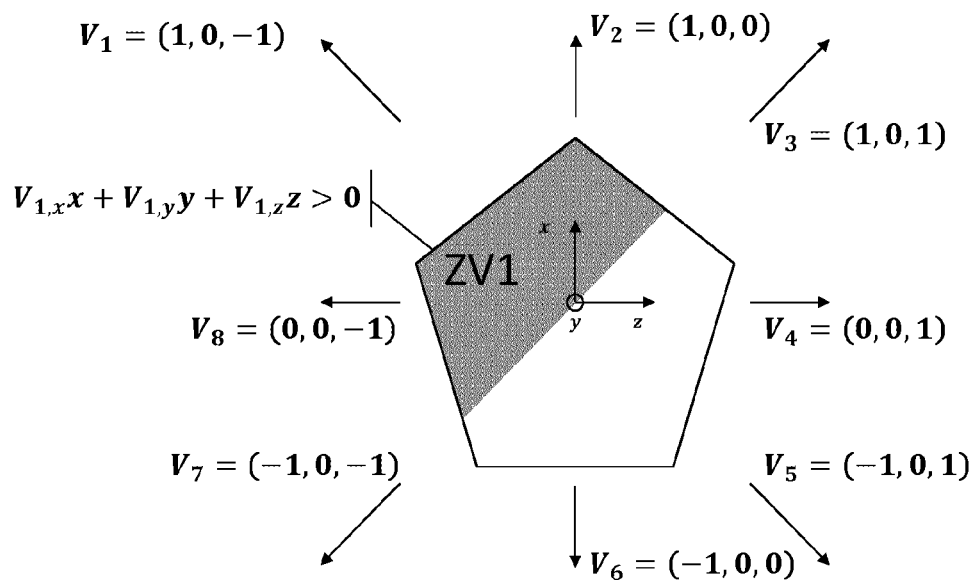
Figure 6:
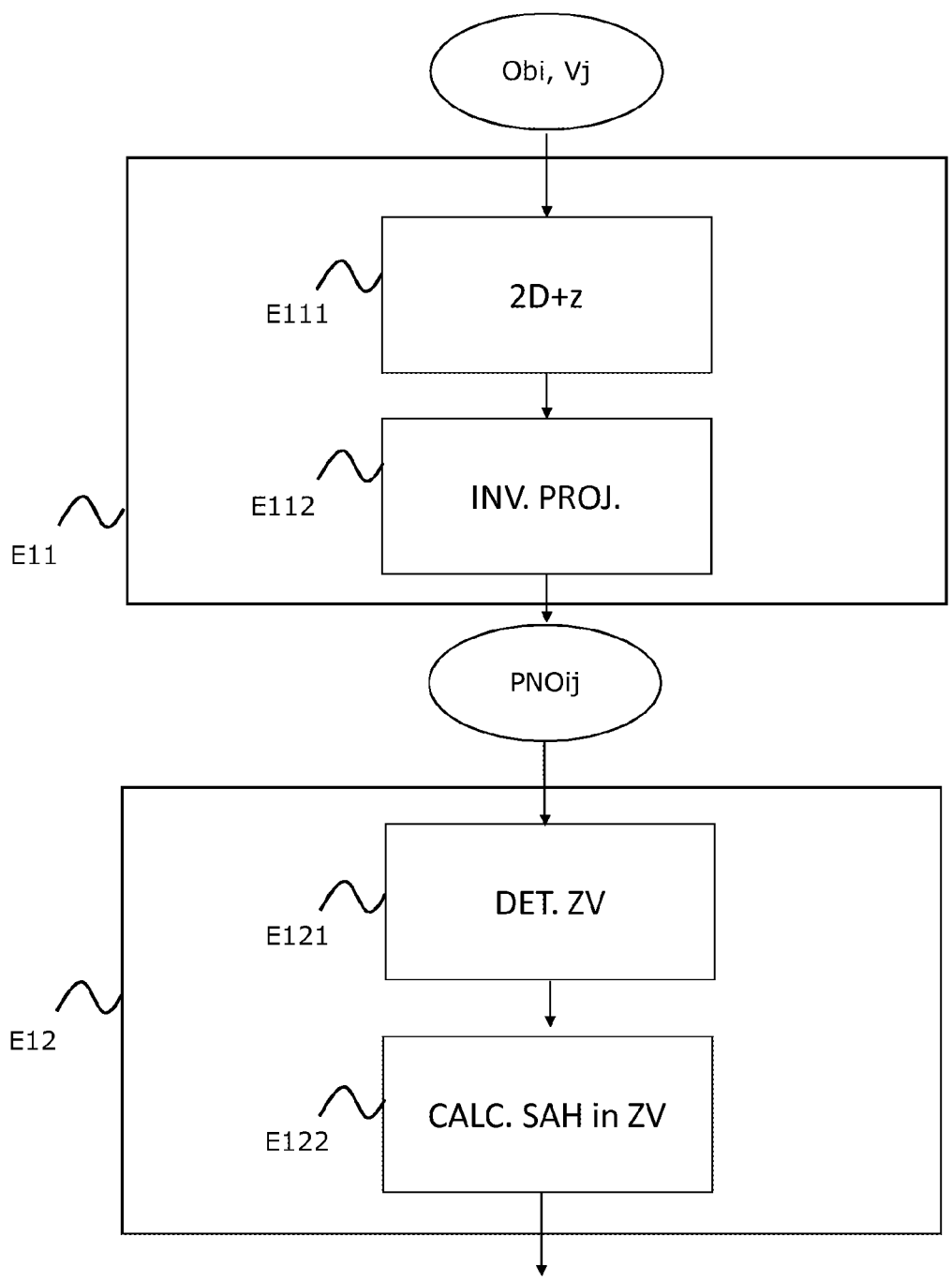
Figure 7:
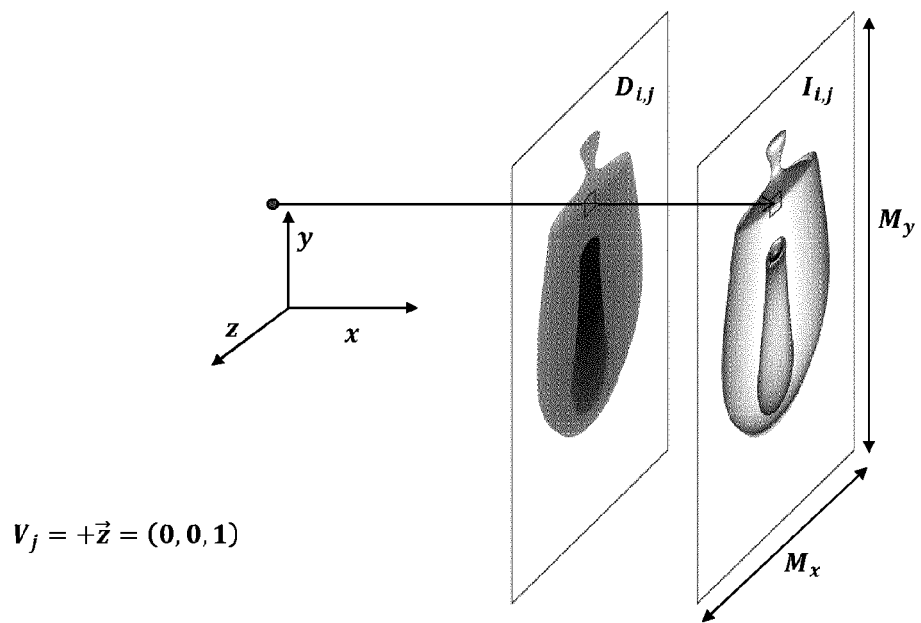
Figure 8:
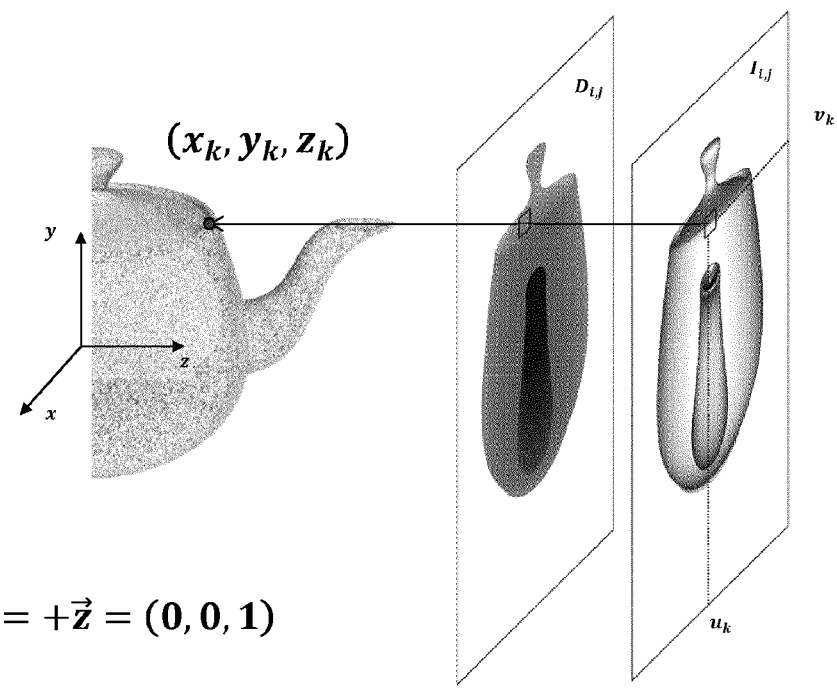
Figure 9:
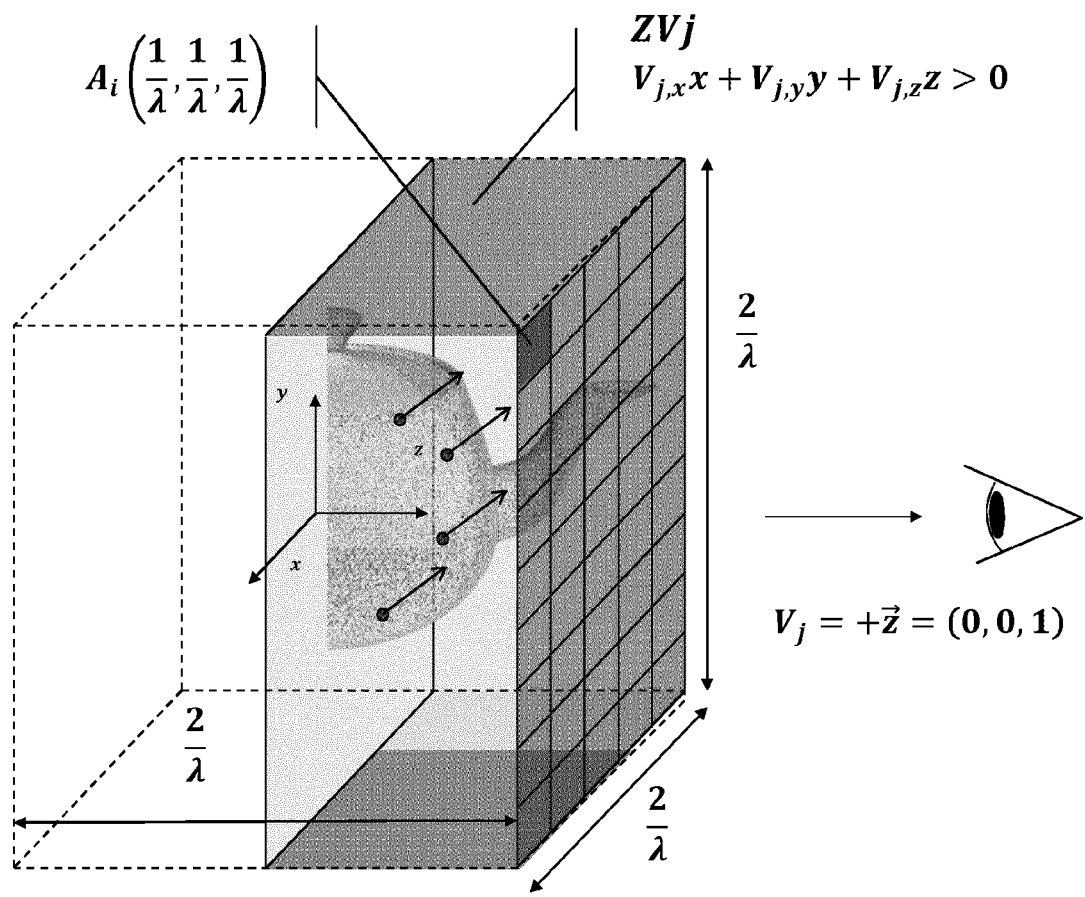
Figure 10:
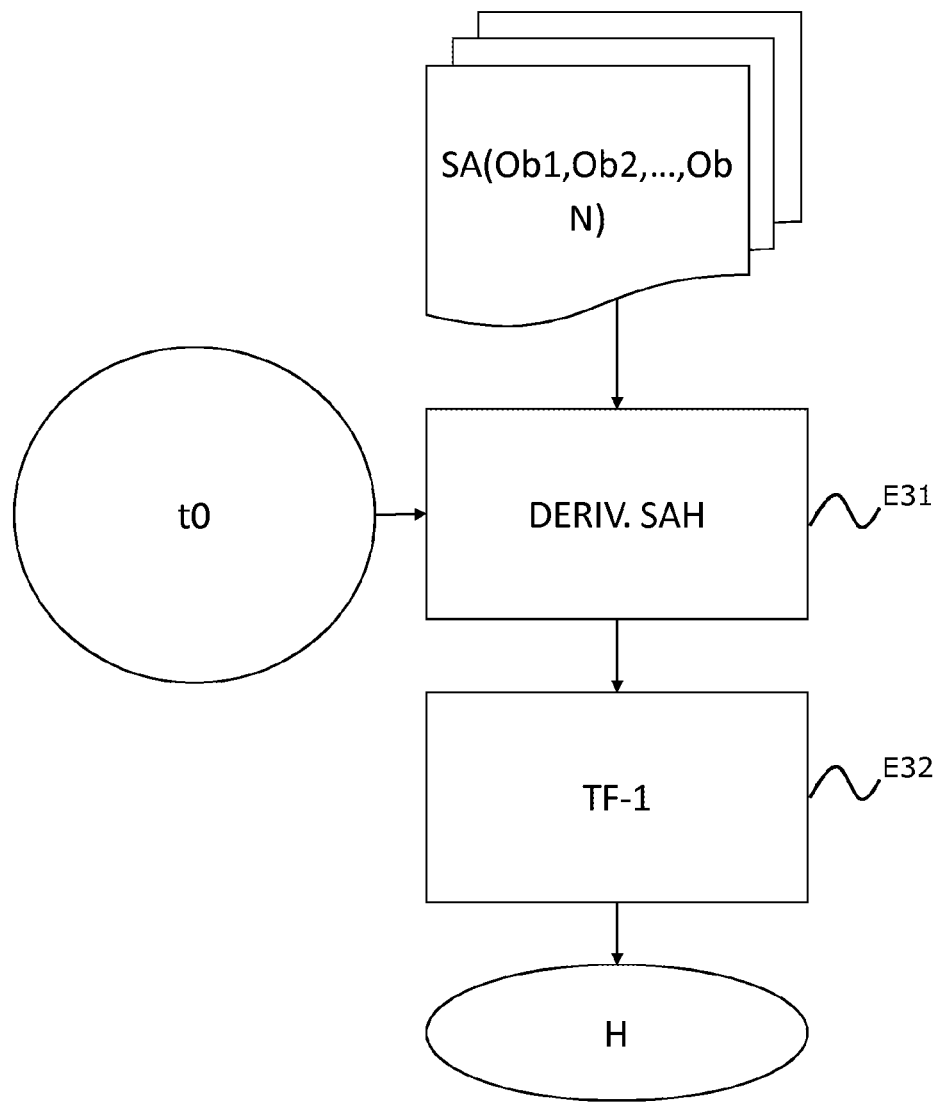
Figure 11:
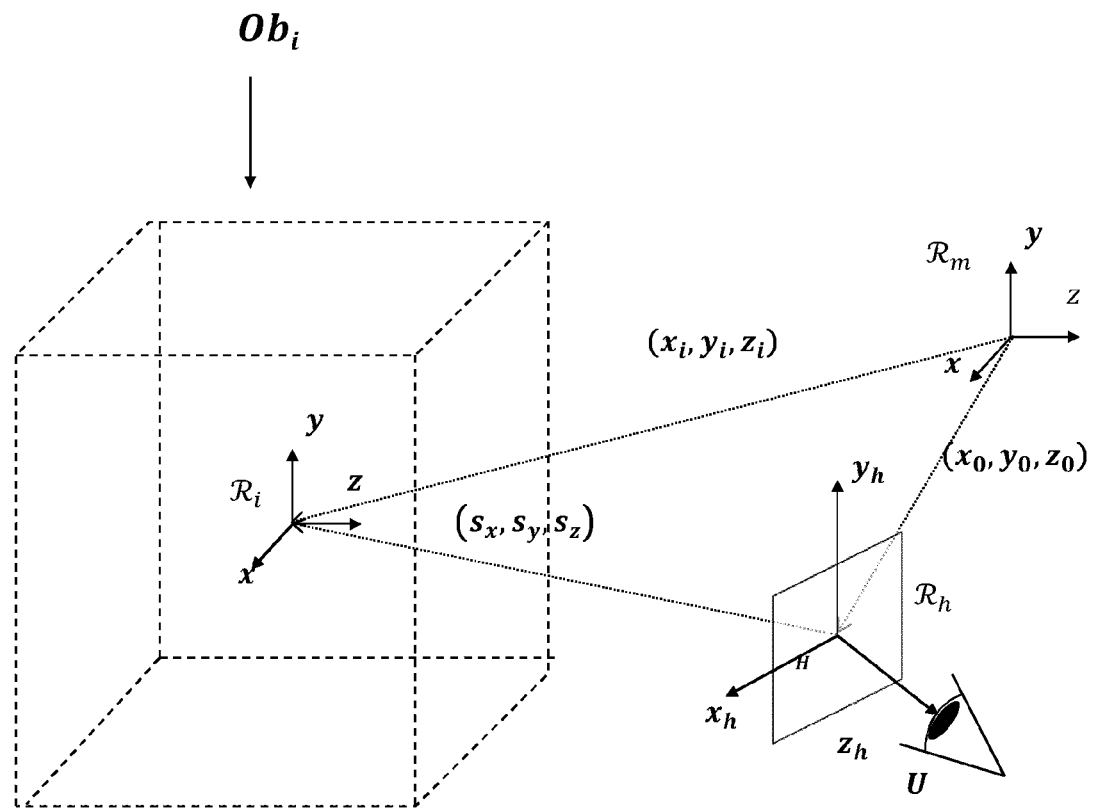
Figure 12:
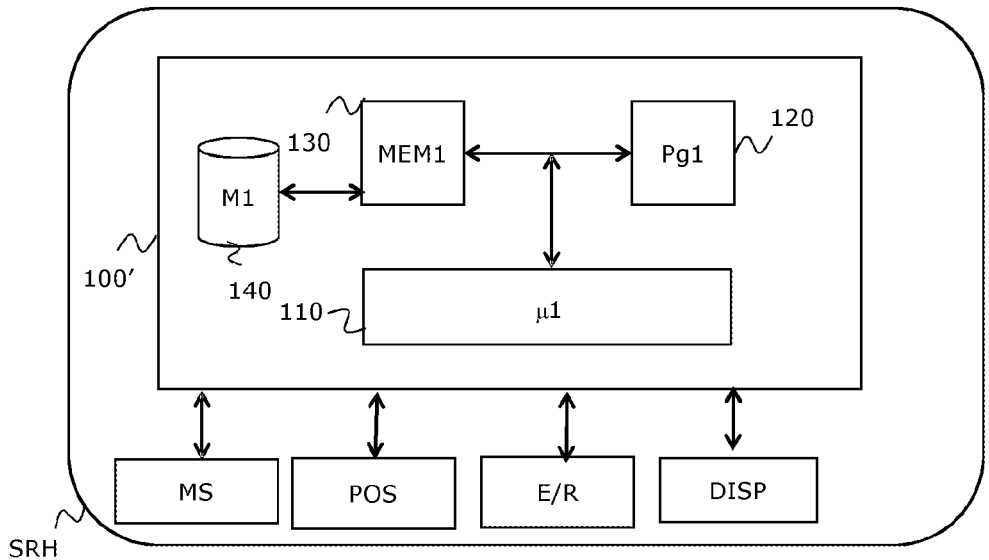
Figure 13:
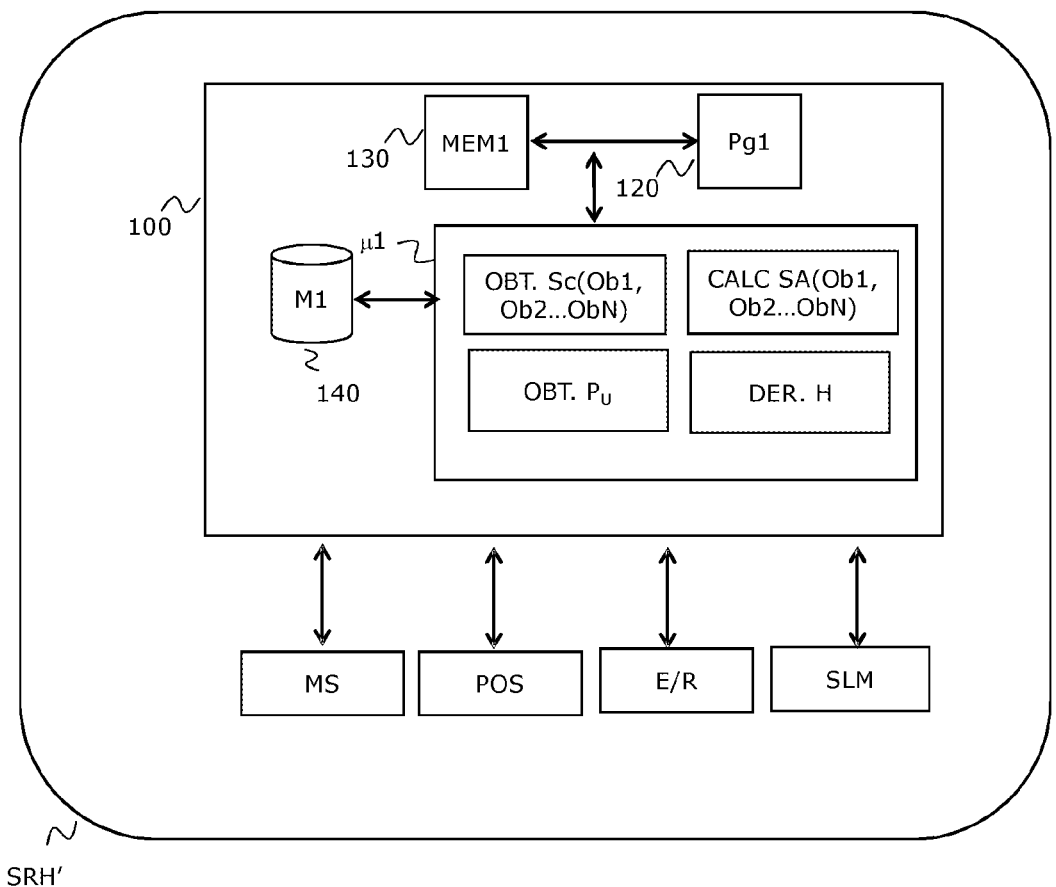

Other advantages and features of the invention will appear more clearly upon reading of the following description of a particular embodiment of the invention, given by way of simple illustrative and non-limitative example, and of the appended drawings, among which:

FIGS. 1 to 3, already described, schematically illustrate a method for generating a hologram from an angular spectrum calculated on a sphere, according to the prior art;

FIG. 4 schematically shows the steps of a method for generating a digital hologram according to the invention;

FIGS. 5A to 5C schematically illustrate examples of geometric solids in cross-sectional view and of viewing directions, implemented by the invention;

FIG. 6 describes in more detail the step of pre-calculating an angular spectrum of the light field emitted by an object of the scene on the surface of a geometric solid according to an embodiment of the invention;

FIG. 7 schematically illustrates an example of 2D+Z rendering in perspective or orthographic projection of the object Obi according to an embodiment of the invention;

FIG. 8 schematically illustrates the step of inversely projecting the points of the intensity image and depth map of an object Obi of a view vj in the world reference frame, according to an embodiment of the invention;

FIG. 9 schematically illustrates an example of sampling according to a regular grid of the faces of a geometric solid and of an area of validity for the pre-calculation of the angular spectrum emitted by an object, according to an embodiment of the invention;

FIG. 10 illustrates in more detail the step of deriving the hologram from the omnidirectional angular spectrum of each of the objects of the scene, according to an embodiment of the invention;

FIG. 11 schematically illustrates the arrangement of an object of the scene, a faced geometric solid centered on the object and the hologram plane in a world reference frame, according to an embodiment of the invention;

FIGS. 12 and 13 schematically illustrate examples of material structures of a device for generating a digital hologram according to an embodiment of the invention.

7. DESCRIPTION OF A PARTICULAR EMBODIMENT OF THE INVENTION

The general principle of the invention is based on a pre-calculation step, in which the omnidirectional angular spectrum emitted by each object of the scene is calculated at the surface of a geometric solid sampled according to a regular grid. The omnidirectional angular spectrum corresponds to the plane-wave decomposition of the light field emitted by each object. Each plane wave is represented by a frequency coordinate vector corresponding to its direction of propagation and by its complex amplitude. During this pre-calculation step, the occultations of the scene are taken into account for a set of predetermined directions. According to the invention, for a given object, as many angular sub-spectra as directions are calculated. The contributions of each of the sub-spectra associated with the plurality of angular directions are then cumulated to form the angular spectrum of the object.

Upon reception of a new pose of an observer U, the invention derives a hologram in a plane corresponding to this pose, from the angular spectrum pre-calculated on a per-object basis. The holograms associated with each object are summed to form the hologram of the entire scene.

In relation with FIG. 4, it will be described a method for generating a hologram of a 3D scene comprising several objects Ob1, Ob2, . . . , ObN with N a non-null integer, according to an embodiment of the invention.

In the following, a three-dimensional (3D) world reference frame Rm is considered, in which a display plane of a hologram of a 3D scene and an observer U of the hologram can be located.

It is supposed that each object of the scene is defined by a cloud of points associated with intensities in a 3D reference frame of the object, itself located in the world reference frame Rm. Of course, the invention is not limited to this type of data representative of the scene and can also be applied, for example, to a mesh representation of each object. In this case, the points and their associated intensities are obtained from the meshing.

According to the invention, the method for generating a hologram comprises the following steps:

a step E0 of obtaining an object Obi among the plurality of objects comprised in the scene;

a preliminary step E1 of pre-calculating an omnidirectional angular spectrum of the object Obi at the surface of a geometric solid. In the following of the description, several examples of solids are considered. According of a first example illustrated by FIG. 5A, it is a sphere. According to a second example illustrated by FIG. 5B, it is a faced geometric solid, in particular a cube. According to a third example illustrated by FIG. 5C, it is a pentagonal prism. Of course, the invention is not limited to these examples and applies to any type of geometric solid, comprising faces or not.

The omnidirectional angular spectrum corresponds to the plane-wave decomposition of the light field emitted by each object Ob1, Ob2 . . . ObN of the scene Sc. Each plane wave is represented by a 3D frequency coordinate $f=(f_x, f_y, f_z)$ corresponding to its direction of propagation, and by its complex amplitude. During this pre-calculation step, the occultations of the scene are taken into account in an approximative way, i.e. for a limited number of points of view, corresponding to a number of viewing directions. This step E1 will be described in more detail in relation with FIG. 6;

a step E2 of obtaining a pose of an observer U. The pose generally comprises 6 parameters, 3 angles of rotation and 3 parameters of translation. The observer U is for example a user of a near-eye holographic display system, such as augmented reality glasses or a head-mounted display HMD. This kind of device is generally associated with a virtual reality system comprising a module for tracking the helmet position. This system can be based, for example, on a reflective ball fastened on the helmet, this ball being locatable using an infra-red technology, or also on an inertial and magnetic sensor. The position and orientation tracking information is transmitted to the helmet or to a device of the virtual reality system adapted to implement the method according to the invention.

Based on the knowledge of this pose, a position PH of the hologram plane in the world reference frame Rm is immediately derived, which is linked to a viewing window of the HMD device;

a step E3 of deriving the hologram on the fly from the omnidirectional angular spectra pre-calculated for each object of the scene and from the pose obtained. The time of calculation of this step depends only on the resolution of the hologram and not on the complexity or the sampling of the scene, which makes it possible to maintain a constant framerate while ensuring a good visual quality. This step will be detailed hereinafter in relation with FIG. 10.

In relation with FIGS. 4 and 6, the step E1 of pre-calculating an angular spectrum of the field emitted by the object Obi according to an embodiment of the invention will now be described in detail.

For each object Obi, with $i \in \{1 \ldots N\}$, of the scene, a number $M \in \mathbb{N}$ of viewing directions $V_j \in \mathbb{R}^3$ (with $j \in \{1 \ldots M\}$) is defined, with M non-null higher than or equal to 2, associated with a view vj. For each of these viewing directions, the occultations will be exactly calculated.

At E10, a viewing direction $V_j$ is obtained.

At E11, for the viewing direction $V_j$, a set of points of the object Obi that are not occulted is determined. For that purpose, according to this embodiment, a 2D+Z rendering in perspective or orthographic projection of the object i is performed at E111, as illustrated by FIG. 7. For that purpose, it is made use of the 3×4 homogeneous coordinate projection matrix given by $$MP_j = K \begin{bmatrix} R_j & -R_j t_j \\ 0^T & 1 \end{bmatrix},$$

with $R_j$ the 3×3 rotation matrix and $t_j$ the translation vector of size 3 corresponding to the point of view j, and K the 3×4 perspective or orthographic projection matrix of the camera, given by $$K = \begin{bmatrix} 1/\Delta & 0 & 0 & M_x/2 \\ 0 & 1/\Delta & 0 & M_y/2 \\ 0 & 0 & 0 & 1 \end{bmatrix}$$

if the projection is an orthographic one, an by $$K = \begin{bmatrix} f/\Delta & 0 & M_x/2 & 0 \\ 0 & f/\Delta & M_y/2 & 0 \\ 0 & 0 & 1 & 0 \end{bmatrix}$$

if the projection is a perspective one, of focal distance f.

At the end of this rendering, we obtain an intensity image $I_{i,j}$ and a depth map $D_{i,j}$ associated with the view vj.

To calculate the occultations in the viewing direction Vj, it is for example made use of a technique of the painter algorithm or also Z-buffer type, known from the person skilled in the art. For an object $Ob_i$ of the scene, the depth of a pixel (Z coordinate) is stored in a buffer (Z-buffer), which herein corresponds to the depth map $D_{i,j}$. This map is a two-dimensional image (X and Y), each element corresponding to a pixel of the intensity image $I_{i,j}$ of the object $Ob_i$ for the view $v_j$. If another element of the object must be displayed at the same coordinates (X, Y), the two depths (Z) are compared to each other, and the pixel that is the nearest of the camera is held. The value Z of this pixel is then placed in the depth map, hence replacing the old one. Finally, the drawn image reproduces the perception of the usual and logical depth, the nearest object hiding the farthest ones.

In the embodiment described hereinafter, M is set to 6 and the rendering of the object is performed in orthographic projection, along the directions $+\vec{x}, -\vec{x}, +\vec{y}, -\vec{y}, +\vec{z}$ et $-\vec{z}$. We hence have one viewing direction per face of the cube.

For example, as illustrated by FIG. 7, for the direction $+\vec{z}$ the following orthographic projection matrix is used:

$$MP + \vec{z} = \begin{vmatrix} 1/\Delta & 0 & 0 & M_x/2 \\ 0 & 1/\Delta & 0 & M_y/2 \\ 0 & 0 & 0 & 1 \end{vmatrix},$$

where $\Delta$ denotes the size of the pixels and $(M_x, M_y)$ the resolution of the rendered image. Likewise, for the direction $-\vec{x}$, the orthographic projection matrix is used:

$$MP - \vec{x} = \begin{bmatrix} 0 & 0 & 1/\Delta & M_x/2 \\ 0 & 1/\Delta & 0 & M_y/2 \\ 0 & 0 & 0 & 1 \end{bmatrix}.$$

Of course, the invention is not limited to this particular case. It also allows choosing a number M of viewing directions Vj lower or higher than the number of faces of the solid considered, as illustrated by FIGS. 5B and 5C.

Step E112 of 3D reconstruction by inverse projection.

As illustrated by FIG. 8, for each of the rendered intensity images $I_{i,j}$ and depth maps $D_{i,j}$, at E112, the inverse perspective or orthographic projection of the points of the intensity image $I_{i,j}$ and a depth map $D_{i,j}$ in the 3D space are performed.

Let $\mathcal{R}_i = (O_i; \vec{x}, \vec{y}, \vec{z})$ the local reference frame of the object Obi whose origin is located at the center of the object $O_i = (x_i, y_i, z_i)$ in the world reference frame and whose axes are aligned with those of the world reference frame. As the depth D is encoded on 8 bits, in the case where the projection used is an orthographic projection along the axis $+\vec{z}$, each pixel $(u_k, v_k)$ is projected to a coordinate point k, defined as follows:

$$\begin{pmatrix} x_k \\ y_k \\ z_k \end{pmatrix} = \begin{pmatrix} \left(u_k - \frac{M_x}{2}\right)\Delta \\ \left(v_k - \frac{M_y}{2}\right)\Delta \\ \frac{255-d}{255}(z_{max} - z_{min}) + z_{min} \end{pmatrix},$$

in the reference frame $\mathcal{R}_i$, with $d = D(u_k, v_k)$, and of amplitude $\sqrt{I_{i,j}(u_k, v_k)}$.

At E121, an area of validity ZV of the calculated occultations is determined. It corresponds to a portion of the surface of the geometric solid considered, inside which the amplitudes of the samples associated with frequency vectors will receive the contributions of these points of the object Oi for the viewing direction Vj. In other words, the matter is to determine the portion of this surface that is included in a viewing cone about the viewing direction Vj. By simplicity, it may be chosen to calculate only the values of the samples of coordinates (x,y,z) that satisfy the condition $V_{j,x}x + V_{j,y}y + V_{j,z}z > 0$. The considered cone makes an angle of 90 degrees with the direction Vj. In relation with FIG. 5A, when V1 corresponds to a radius of a sphere, the surface of validity V1 is that of a half-sphere centered on V1. In relation with FIG. 9, when Vj is orthogonal to a face, this amounts to taking the surface ZVj of the half-cube around Vj. FIGS. 5B and 5C illustrate other examples of surfaces of validity for faced geometric solids of the cube or octahedron type.

Of course, the invention is not limited to this particular condition. The area of validity of the calculated occultations can be associated with a cone of smaller angle, as a function of the number of viewing directions Vj and of their distribution, uniform or not, in space. For example, in relation with FIG. 5A, if we have 8 viewing directions fairly distributed in a plane of the sphere, it may be chosen an angle equal to 360/8 degrees to guarantee an overlap between the areas of validity and to avoid breaks in continuity when passing from one viewing direction to another one.

A cloud of points PNO is hence obtained for each view vj of the object Obi, associated with the viewing direction Vj. In other words, it is the sub-set of the points of the object that are visible, i.e. not occulted, from the viewing direction Vj.

Step E12: calculating the angular sub-spectrum SSAij corresponding to the viewing direction Vj.

Once the sub-set of non-occulted points PNO corresponding to the view vj of the object Obi obtained, the following step E122 consists in calculating the corresponding omnidirectional angular sub-spectrum SSAij, on the surface of the geometric solid.

Hereinafter, this step is described in more detail for the example of a cube of side $2/\lambda$, and whose center coincides with the origin of the reference frame $\mathcal{R}_i$, as illustrated by FIG. 5B. Of course, the invention is not limited to this particular case but is applied to any geometric solid. If it is a sphere, a sampling as described in the above-mentioned prior art US2016/0231706 will be used.

In relation with FIG. 9, the faces of this cube are sampled according to a grid comprising a regular grid pattern, and each of the so-obtained samples (x,y,z) are allocated with the following amplitude value:

$$A_{i,j}(x, y, z) = \sum_{k=1}^{M_x M_y} \sqrt{I_{i,j}(u_k, v_k)} \exp\left(-j\frac{2\pi}{\lambda}(f_x x_k + f_y y_k + f_z z_k)\right),$$

with $\lambda$ the wavelength used, and $$\begin{pmatrix} f_x \\ f_y \\ f_z \end{pmatrix} = \frac{1}{\sqrt{x^2 + y^2 + z^2}} \begin{pmatrix} x \\ y \\ z \end{pmatrix}.$$

It is observed that neither the resolution nor the size of the pixels of the hologram intervene in the preceding formula, which makes the angular spectrum generic to any type of hologram.

As mentioned hereinabove, this amplitude Aij is calculated for the samples (x,y,z) located in the determined area of validity.

The three sub-steps E10, E11, E12 are repeated for each angular direction Vj, $j \in \{1 \ldots M\}$. At E13, the omnidirectional angular spectrum $SA_i$ of the object Obi is then calculated by accumulating the amplitudes calculated for all the views vj with $j \in \{1 \ldots M\}$, as follows:

$$A_i(x, y, z) = \sum_{j=1}^{M} A_{i,j}(x, y, z)$$

The obtained omnidirectional angular spectrum SAi is then stored into a memory for a later use.

Advantageously, it is stored into a structure of the "cube-map texture" type, well known from the person skilled in the art and described for example at the following address http://en.wikipedia.org/wiki/Cube_mapping).

This storage structure has for advantage to be a simple structure whose addressing and interpolation between samples can be hardware-accelerated.

Steps E0 and E1 are repeated for each object Obi of the scene.

It is supposed that, at E2, a pose of the observer U is obtained, from which a position of the plane PH of the hologram to be generated is derived, as described hereinabove.

In relation with FIG. 10, the step E3 of deriving the hologram from the plurality of pre-calculated angular spectra SAi will now be described in detail.

Let H be the hologram to be calculated. Its resolution is given by $(N_x, N_y)$, and the size of its pixels is p. Typically, the holographic screens (SLMs) currently available, of the Spatial Light Modulator or SLM type, have a maximum resolution of the order of (3840,2160) and a minimum pixel size of the order of 3.74 μm.

In relation with FIG. 11, let's note $\mathcal{R}_h = (O; \vec{x}_h, \vec{y}_h, \vec{z}_h)$, the local reference frame of the hologram, whose origin is located at the center of the hologram H, whose axes defined by $\vec{x}_h$ and $\vec{y}_h$ coincide with the horizontal and vertical axes of the hologram, respectively, and whose axis defined by $\vec{z}_h$ coincide with the optical axis of the hologram. Let's note $$\vec{x_h} = \begin{pmatrix} x_{h0} \\ x_{h1} \\ x_{h2} \end{pmatrix}, \vec{y_h} = \begin{pmatrix} y_{h0} \\ y_{h1} \\ y_{h2} \end{pmatrix} \text{ and } \vec{z_h} = \begin{pmatrix} z_{h0} \\ z_{h1} \\ z_{h2} \end{pmatrix}.$$

Finally, let's note $t_h = (x_0, y_0, z_0)$, the position of the center of the hologram in the world reference frame. The step of deriving the hologram H from the angular spectrum is decomposed into 2 sub-steps:

Sub-step E31: It consists in constructing the angular spectrum of the hologram $\hat{H} = \mathcal{F}\{H\}$, from angular spectra SAi pre-calculated for the N objects Obi of the scene.

The angular spectrum of the hologram is sampled on a regular grid of resolution $(N_x, N_y)$, with a sampling pitch of $(N_x p)^{-1}$ and $(N_y p)^{-1}$, in the horizontal and vertical directions, respectively. Hence, the frequencies fhx, fhy of the hologram are comprised between −½p and ½p.

The angular spectrum of the hologram is given by the following formula:

$$\hat{H}(f_{h,x}, f_{h,y}) = \sum_{i=1}^{N} A_i\left(\frac{f_x}{\lambda F}, \frac{f_y}{\lambda F}, \frac{f_z}{\lambda F}\right) \exp\left(j 2\pi \left(s_x f_{h,x} + s_y f_{h,y} + s_z \sqrt{\lambda^{-2} - f_{h,x}^2 - f_{h,y}^2}\right)\right),$$

where:

$$F = \max(f_x, f_y, f_z),$$

$$\begin{pmatrix} s_x \\ s_y \\ s_z \end{pmatrix} = \begin{bmatrix} x_{h0} & x_{h1} & x_{h2} \\ y_{h0} & y_{h1} & y_{h2} \\ z_{h0} & z_{h1} & z_{h2} \end{bmatrix} \begin{pmatrix} x_i - x_0 \\ y_i - y_0 \\ z_i - z_0 \end{pmatrix}$$

denotes the position of the center of the object i in the reference frame $\mathcal{R}_h$, and $$\begin{pmatrix} f_x \\ f_y \\ f_z \end{pmatrix} = \begin{bmatrix} x_{h0} & y_{h0} & z_{h0} \\ x_{h1} & y_{h1} & z_{h1} \\ x_{h2} & y_{h2} & z_{h2} \end{bmatrix} \begin{pmatrix} f_{h,x} \\ f_{h,y} \\ \sqrt{\lambda^{-2} - f_{h,x}^2 - f_{h,y}^2} \end{pmatrix}$$

the frequency coordinates of the angular spectrum of the hologram in the reference frame Ri of the object Obi.

As $\hat{H}$ is sampled according to a regular grid, the change of coordinates $(f_{h,x}, f_{h,y}) \rightarrow (f_x, f_y, f_z)$ (which corresponds to a rotation) has for effect to distort the sampling grid. Hence, it is possible that the value $A_i$ $$\left( \frac{f_x}{\lambda M}, \frac{f_y}{\lambda M}, \frac{f_z}{\lambda M} \right)$$

has not been calculated during step E31, and an interpolation is very often necessary. A bilinear interpolation can be used, but better results are obtained using a bicubic interpolation, these two techniques being known from the person skilled in the art.

Sub-step E32: Once the angular spectrum of the hologram calculated, the last step consists in applying thereto an inverse Fourier transform to obtain the hologram H, according to the following formula:

$$H(x,y) = \mathcal{F}^{-1}\{\hat{H}\}(x,y)$$

With the invention, it hence becomes possible for an observer wearing a near-eye holographic rendering system to move around a scene comprising several objects and to view in real time a hologram of this scene adapted to his pose.

It will be noted that the just-described invention can be implemented by means of software and/or hardware components. With this in mind, the terms "module" and "entity", used in this document, can correspond either to a software component, or to a hardware component, or also to a set of material and/or software components, adapted to implement the described function(s) for the concerned module or entity.

In relation with FIGS. 12 and 13, the simplified structure of a device for generating a digital hologram 100, 100', suitable for implementing the method for generating a digital hologram according to any one of the particular embodiments of the invention, just described in relation with FIGS. 4 to 11, will now be described.

The processing device 100, 100' is in particular configured for:

For each object, calculating an "omnidirectional" angular spectrum of the light field emitted by an object of the scene at the surface of a geometric solid centered on said object, a surface of said solid being sampled according to a predetermined grid, a sample of the grid being associated with a frequency vector ($f = (f_x, f_y, f_z)$) and an amplitude corresponding to a sum of contributions to the light field of points of the object along a direction equal to that of the frequency vector;

For the scene:
obtaining a pose ($P_U$) of an observer;
deriving an angular spectrum of the hologram ($SA_H$) of the scene as a function of the pose obtained from the "omnidirectional" angular spectra ($Sa_i$) calculated for each object.

According to the invention, during the calculation of an angular spectrum of the light field for each object of the scene, the device 100 is moreover configured for: calculating an angular spectrum of the light field for each object of the scene, for a plurality of predetermined viewing directions:

for each viewing direction (Vj):
determining a sub-set of non-occulted points of the object;
calculating an angular sub-spectrum of the light field emitted by the points of the sub-set; and
summing over the plurality of predetermined angular directions, the amplitudes of the calculated angular sub-spectra, associated with a same sample of the grid.

According to a particular embodiment of the invention illustrated in FIG. 12, the device for generating a digital hologram 100 has the conventional architecture of a computer and comprises in particular a processing unit 110 equipped with a processor $\mu_1$ and piloted by a computer program $Pg_1$ 120, stored into a memory 130 and implementing the method according to the invention. At the initialization, the code instructions of the computer program $Pg_1$ 120 are for example loaded into a memory RAM before being executed by the processor of the processing unit 110. The processor of the processing unit 110 implements the steps of the above-described method, according to the instructions of the computer program 120.

According to another particular embodiment of the invention illustrated by FIG. 13, the processing method is implemented by functional modules. For that purpose, the device 100' comprises at least the following functional modules:

a module OBT. Sc for obtaining data representative of a scene comprising at least one object;
a module CALC. Sai for calculating an angular spectrum of a light field emitted by a said object, called "omnidirectional" angular spectrum, at the surface of a faced geometric solid;
a module OBT. $P_U$ for obtaining a pose of the observer;
a module DER. H for deriving the hologram from the angular spectra calculated for each object and from the pose $P_U$.

According to an embodiment of the invention, the module for calculating an angular spectrum comprises the following sub-modules adapted to be implemented for a plurality of predetermined viewing directions:

for each viewing direction (Vj):
determining a sub-set of non-occulted points of the object;
calculating an angular sub-spectrum of the light field emitted by the points of the sub-set; and
summing over the plurality of predetermined angular directions the amplitudes of the calculated angular sub-spectra, associated with a same sample of the grid.

Advantageously, the device 100' further comprises a module M1 for storing the angular spectra SAi of the objects Obi of the scene.

These units are piloted by the processor $\mu1$ of the processing unit 110.

The processing unit 110 cooperates with the different above-described functional modules and the memory MEM1 in order to implement the steps of the generating method according to the invention. The different above-described functional modules may be in hardware and/or software form. In software form, such a functional module may include a processor, a memory and program code instructions to implement the function corresponding to the module when the code instructions are executed by the processor. In hardware form, such a functional module may be implemented by any type of suitable coding circuits, such as for example and non-limitatively, microprocessors, digital signal processors (DSPs), Application Specific Integrated Circuit (ASICs), field programmable gate arrays (FPGAs), a logical unit wiring.

Advantageously, such a device 100, 100' can be integrated to a holographic rendering system SRH, for example a near-eye system, such as a head-mounted display. The device 100, 100' is then arranged to cooperate at least with the following modules of the system:
- a data transmission/reception module E/R, through which it receives information of the description of the scene;
- a module POS for tracking the position of the observer in the World Reference Frame Rm;
- a holographic screen SLM adapted to render the hologram; and
- a memory MS adapted to store the pre-calculated angular spectra of each object (Obi) of the scene (Sc).

The field of application of the invention is that of augmented reality. All the variations are conceivable, such as navigation aid, content enrichment, military applications, videoconference, collaborative work, telemedicine . . . .

Among these examples, a concrete application is the display of a set of virtual objects in the direct environment of the observer by means of a head-mounted display equipped with an augmented reality application. The head-mounted display is integrated to a holographic rendering system according to the invention.

In an example of use not shown, the holographic system comprises a server adapted to transmit data to the head-mounted display through a wireless link, which pre-calculates the omnidirectional angular spectrum of each virtual object before the starting of the application. At starting of the application, the data of each spectrum are copied into the local memory MS of the head-mounted display. Then, when the user moves within the virtual content, the head-mounted display derives the hologram corresponding to the point of view of the user, in real time, from the pre-calculated data.

For example, the objects of the scene are the correspondents of the observer during a videoconference. An advantage is that the hologram is derived locally from the pre-calculated spectra, which makes it possible to offer a minimum latency.

As an alternative the angular spectra could be stored into a local memory of the server. Upon reception of a pose of the observer U from the tracking module, the head-mounted display transmits it to the server, which calculates the hologram adapted to the received pose and forwards it to the head-mounted display. An advantage is to make a lighter and cheaper head-mounted display.

It is obvious that the above-mentioned embodiments have been given for purely informative and non-limiting purposes, and that many modifications can be easily made by the person skilled in the art without thereby departing from the framework of the invention.

The invention claimed is:

1. A method for generating a digital hologram representative of a 3D scene,
said scene comprising at least one object ($Ob_1$) defined by a set of points each point having an associated intensity, said method comprising:
for each said object (Obi), a preliminary step (E1) of calculating an "omnidirectional" angular spectrum (SAai) corresponding to a plane-wave decomposition of a light field emitted by the object at a surface of a geometric solid centered on said object, the surface of said solid being sampled according to a predetermined grid, wherein the calculating associates a sample (x,y,z) of the grid to a frequency vector ($f=(f_x, f_y, f_z)$) and to an amplitude (Ai) corresponding to a sum of contributions to the light field of points of the object along a direction equal to that of the frequency vector;
for the scene, the following steps:
obtaining (E2) a pose ($P_U$) of an observer (U);
deriving (E3) the hologram (H) of the scene as a function of the pose obtained from the "omnidirectional" angular spectra (SAi) calculated for each said object;
wherein the step (E1) of calculating the angular spectrum of the light field for each said object of the scene comprises, for a plurality of predetermined viewing directions, the following sub-steps:
for each said viewing direction (Vj):
determining (E11) a sub-set of the points of the object, comprising the non-occulted points; and
calculating (E12) an angular sub-spectrum of the light field emitted by the points of the determined sub-set; and
summing (E13) over the plurality of predetermined angular directions the amplitudes of the calculated angular sub-spectra, associated with a same sample of the grid.

2. The method for generating a digital hologram according to claim 1,
wherein the step of determining the sub-set of non-occulted points comprises the following sub-steps:
2D+Z rendering (E111) the object by projecting the points of the object along the viewing direction (Vj) and forming an intensity image and a depth map of the projected points; and
inversely projecting (E112) the points of the formed intensity image to points of the object in a reference frame of the object and calculating the coordinates thereof as a function of the depth map.

3. The method for generating a digital hologram according to claim 2,
wherein the step of calculating the angular sub-spectrum (E12) comprises a sub-step (E121) of determining an area of validity of the occultations associated with a viewing direction at the surface of the geometric solid and wherein the calculation (E122) of the sample amplitudes is performed for the samples comprised in said area.

4. The method for generating a digital hologram according to claim 2,
wherein the geometric solid comprises a plurality of plane faces and wherein the predetermined grid is cut into a plurality of sub-grids forming a regular grid pattern, a sub-grid being associated with a face of the solid.

5. The method for generating a digital hologram according to claim 1,
wherein the step of calculating the angular sub-spectrum (E12) comprises a sub-step (E121) of determining an area of validity of the occultations associated with a viewing direction at the surface of the geometric solid and wherein the calculation (E122) of the sample amplitudes is performed for the samples comprised in said area of validity.

6. The method for generating a digital hologram according to claim 5,
wherein the geometric solid comprises a plurality of plane faces and wherein the predetermined grid is cut into a plurality of sub-grids forming a regular grid pattern, a sub-grid being associated with a face of the solid.

7. The method for generating a digital hologram according to claim 5,
wherein the samples comprised in the area of validity satisfy the following condition:

$$V_{j,x}x + V_{j,y}y + V_{j,z}z > 0$$

where (x,y,z) denotes the position of the sample and (Vx, Vy, Vz) the viewing direction in a reference frame (Ri) of the object (Obi).

8. The method for generating a digital hologram according to claim 7,
wherein the geometric solid comprises a plurality of plane faces and wherein the predetermined grid is cut into a plurality of sub-grids forming a regular grid pattern, a sub-grid being associated with a face of the solid.

9. The method for generating a digital hologram according to claim 1,
wherein the geometric solid comprises a plurality of plane faces and wherein the predetermined grid is divided into a plurality of sub-grids forming a regular grid pattern, each of the sub-grids being associated with one of the plane faces of the solid.

10. The method for generating a digital hologram according to claim 9,
wherein the amplitude associated with a sample of the sub-grid associated with one of the faces of the solid, for the calculation of the angular sub-spectrum along a said viewing direction, is defined by the following formula:

$$A_{i,j}(x, y, z) = \sum_{k=1}^{M_x M_y} \sqrt{I_{i,j}(u_k, v_k)} \exp\left(-j\frac{2\pi}{\lambda}(f_x x_k + f_y y_k + f_z z_k)\right),$$

with Mx, My being the dimensions of the intensity and depth images, $\lambda$ being the wavelength used, and $$\begin{pmatrix} f_x \\ f_y \\ f_z \end{pmatrix} = \frac{1}{\sqrt{x^2 + y^2 + z^2}} \begin{pmatrix} x \\ y \\ z \end{pmatrix}$$

being the frequencies associated with the sample (x,y,z).

11. The method for generating a digital hologram according to claim 10,
wherein the geometric solid is a cube.

12. The method for generating a digital hologram according to claim 10,
wherein the plurality of viewing directions comprises as many directions as the solid has faces.

13. The method for generating a digital hologram according to claim 9,
wherein the geometric solid is a cube.

14. The method for generating a digital hologram according to claim 9, wherein a number of the plurality of viewing directions is equal to a number of the faces.

15. A non-transitory computer-readable recording medium, readable by a processor, on which is recorded a computer program comprising program code instructions for executing the steps of the method according to claim 1 when executed by the processor.

16. The method for generating a digital hologram according to claim 1,
wherein the step of deriving the angular spectrum of the hologram of the scene comprises deriving the angular spectrum of a sub-hologram for each said object of the scene from the angular spectrum of said object, summing the angular spectra of the derived sub-holograms and applying (E32) an inverse Fourier transform to the derived angular spectrum to obtain the hologram (H).

17. The method for generating a digital hologram according to claim 16,
wherein the angular spectrum of the hologram is derived from the "omnidirectional" angular spectra (SAi) calculated for each said object (Obi) according to the following formula:

$$\hat{H}(f_{h,x}, f_{h,y}) = \sum_{i=1}^{N} SA_i\left(\frac{f_x}{\lambda F}, \frac{f_y}{\lambda F}, \frac{f_z}{\lambda F}\right) \exp\left(j2\pi\left(s_x f_{h,x} + s_y f_{h,y} + s_z \sqrt{\lambda^{-2} - f_{h,x}^2 - f_{h,y}^2}\right)\right),$$

where:

$\mathcal{R} = ((O; \vec{x}_h, \vec{y}_h, \vec{z}_h)$ denotes a local reference frame of the hologram whose origin is located at the center of the hologram H, whose axes defined by $\vec{x}_h$ and $\vec{y}_h$, coincide with the horizontal and vertical axes of the hologram, respectively, and whose axis defined by $\vec{z}_h$ coincides with the optical axis of the hologram, $$\vec{x}_h = \begin{pmatrix} x_{h0} \\ x_{h1} \\ x_{h2} \end{pmatrix}, \vec{y}_h = \begin{pmatrix} y_{h0} \\ y_{h1} \\ y_{h2} \end{pmatrix} \text{ and }$$

$$\vec{z}_h = \begin{pmatrix} z_{h0} \\ z_{h1} \\ z_{h2} \end{pmatrix},$$

$$F = \max(f_x, f_y, f_z),$$

$$\begin{pmatrix} s_x \\ s_y \\ s_z \end{pmatrix} = \begin{bmatrix} x_{h0} & x_{h1} & x_{h2} \\ y_{h0} & y_{h1} & y_{h2} \\ z_{h0} & z_{h1} & z_{h2} \end{bmatrix} \begin{pmatrix} x_i - x_0 \\ y_i - y_0 \\ z_i - z_0 \end{pmatrix}$$

denotes the position of the center of the object Obi in the reference frame $\mathcal{R}_h$, and $$\begin{pmatrix} f_x \\ f_y \\ f_z \end{pmatrix} = \begin{bmatrix} x_{h0} & y_{h0} & z_{h0} \\ x_{h1} & y_{h1} & z_{h1} \\ x_{h2} & y_{h2} & z_{h2} \end{bmatrix} \begin{pmatrix} f_{h,x} \\ f_{h,y} \\ \sqrt{\lambda^{-2} - f_{h,x}^2 - f_{h,y}^2} \end{pmatrix}$$

denotes frequency coordinates of the angular spectrum of the hologram in the reference frame (Ri) of the object Obi.

18. A device (100, 100') for generating a digital hologram (H) representative of a 3D scene comprising at least one object (Obi), said device comprising a processor that is configured for:

For each object, calculating an "omnidirectional" angular spectrum corresponding to the plane-wave decomposition of the light field emitted by an object of the scene at the surface of a geometric solid centered on said object, a surface of said solid being sampled according to a predetermined grid, the calculation associating a sample of the grid to a frequency vector ($f=(f_x, f_y, f_z)$) and to an amplitude corresponding to a sum of contributions to the light field of points of the object along a direction equal to that of the frequency vector;

For the scene:

Obtaining a pose ($P_U$) of an observer (U);

Deriving the hologram (H) of the scene as a function of the pose obtained from the "omnidirectional" angular spectra (SAi) calculated on a per-object basis;

wherein the device is further configured for, during the calculation of an angular spectrum of the light field for each object of the scene, for a plurality of predetermined viewing directions:

for each viewing direction (Vj):

determining a sub-set of non-occulted points of the object;

calculating an angular sub-spectrum of the light field emitted by the points of the sub-set; and summing over the plurality of predetermined angular directions the amplitudes of the calculated angular sub-spectra, associated with a same sample of the grid.

19. A holographic rendering system (SRH, SRH') comprising a module for obtaining a three-dimensional scene comprising at least one object, a module for obtaining an observer's pose, and a holographic screen (SLM) adapted to render a hologram, wherein the system further comprises the device (100, 100') for generating the hologram according to claim 18.

20. The holographic rendering system (SRH, SRH') according to claim 19, further comprising a head-mounted display suitable for being worn near the eyes of the observer (U), said head-mounted display comprising a storage module (M1) adapted to store the omnidirectional angular spectrum pre-calculated for the at least one object of the scene.

* * * * *